US012709217B2

(12) United States Patent
Nakano et al.

(10) Patent No.: US 12,709,217 B2
(45) Date of Patent: Aug. 18, 2026

(54) ROAD SURFACE DRAWING DEVICE

(71) Applicant: HONDA MOTOR CO., LTD., Tokyo (JP)

(72) Inventors: Shunichi Nakano, Tokyo (JP); Go Shimizu, Tokyo (JP); Yuji Tsuchiya, Saitama (JP); Masayoshi Takori, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 19/116,400

(22) PCT Filed: Oct. 10, 2023

(86) PCT No.: PCT/JP2023/036731
§ 371 (c)(1),
(2) Date: Mar. 28, 2025

(87) PCT Pub. No.: WO2024/080276
PCT Pub. Date: Apr. 18, 2024

(65) Prior Publication Data

US 2026/0103143 A1 Apr. 16, 2026

(30) Foreign Application Priority Data

Oct. 12, 2022 (CN) ......................... 202211248241.9

(51) Int. Cl.
*B60Q 1/34* (2006.01)

(52) U.S. Cl.
CPC ............ *B60Q 1/34* (2013.01); *B60Q 2400/50* (2013.01)

(58) Field of Classification Search
CPC ........ B60Q 1/34; B60Q 2400/50; B60Q 1/50; B60Q 1/26
See application file for complete search history.

(56) References Cited

U.S. PATENT DOCUMENTS

2020/0114812 A1 4/2020 Imaishi et al.
2021/0206312 A1 7/2021 Mochizuki et al.
2022/0341560 A1* 10/2022 Shibata .................. B60Q 1/381

FOREIGN PATENT DOCUMENTS

JP 2019192349 A 10/2019
WO 2019016943 A1 1/2019
WO 2020067113 A1 4/2020
WO 2021049232 A1 3/2021

* cited by examiner

*Primary Examiner* — Omeed Alizada
(74) *Attorney, Agent, or Firm* — CKC & PARTNERS CO., LLC

(57) ABSTRACT

A road surface drawing device is mounted on a vehicle. When the travel direction of a vehicle is changed by an operation performed by the driver of the vehicle, the road surface drawing device draws a pattern by means of light in an area, on a road surface, that includes the side toward which the travel direction is being changed with respect to the vehicle, the pattern indicating the change in travel direction. The pattern includes a plurality of band-shaped patterns spaced apart from each other in vehicle width directions. The plurality of band-shaped patterns are such that the closer the band-shaped pattern is to the outside in the vehicle width direction, the longer the pattern is in vehicle longitudinal directions and the more the front end of the pattern is positioned forwardly.

4 Claims, 12 Drawing Sheets

ROAD SURFACE DRAWING DEVICE

TECHNICAL FIELD

The present invention relates to a road surface drawing apparatus that draws a pattern for notifying a change in a travel direction of its own vehicle, on a road surface by means of light.

BACKGROUND ART

Among road surface drawing apparatuses, there are those which draw a predetermined pattern by means of light in an area which includes the left side of its own vehicle on a road surface at the time of turning left and in an area including the right side of the vehicle on a road surface at the time of turning right, that is, in an area on a road surface including a side to which the travel direction is to be changed, relative to the vehicle.

CITATION LIST

Patent Document

Patent Document 1: Japanese Unexamined Patent Application, Publication No. 2019-192349

DISCLOSURE OF THE INVENTION

Problems to Be Solved by the Invention

According to such a road surface drawing apparatus, it is possible to notify those around its own vehicle of a change in the travel direction of the vehicle by the pattern. The present inventors, however, have noticed that there is room for further improvement about the visibility of the pattern from the surroundings. Then, the present inventors have noticed that, by improvement of the visibility, traffic safety is further improved, and it is possible to contribute to development of a sustainable transport system.

The present invention has been made in view of the above situation, and an object thereof is to improve the visibility of a pattern drawn on a road surface from the surroundings.

Means for Solving the Problems

The present inventors found that, if a pattern drawn on a road surface has a plurality of band-shaped patterns separated from one another in a vehicle width direction, and the further on an outer side in the vehicle width direction a band-shaped pattern is, the longer in a vehicle length direction the band-shaped pattern is, and the further in the front the front end thereof is located, the visibility of the pattern from the surroundings is improved, and came to the present invention. The present invention is road surface drawing apparatuses according to (1) to (4) below.

(1) A road surface drawing apparatus mounted on a vehicle, the road surface drawing apparatus drawing by means of light, when a travel direction of the vehicle is changed based on an operation by a driver of the vehicle, a pattern for notifying a change in the travel direction, in an area on a road surface including a side to which the travel direction is to be changed, relative to the vehicle, the pattern including a plurality of band-shaped patterns separated from one another in a vehicle width direction of the vehicle, the plurality of band-shaped patterns being arranged such that the further on an outer side in the vehicle width direction, which is a side in a direction away from the vehicle in the vehicle width direction, a band-shaped pattern is, the longer in a vehicle length direction of the vehicle the band-shaped pattern is, and the further on a front side in the vehicle length direction a front end thereof is located.

According to the present configuration, since the further on the vehicle-width-direction outer side a band-shaped pattern is, the longer in the vehicle length direction the band-shaped pattern is, and the further on the front side the front end thereof is located, it is easy to intuitively recognize in which direction the car is going to turn from the surroundings.

Moreover, there is a plurality of band-shaped patterns in the vehicle width direction. Therefore, even if a blocking object exists right next to the front end of the vehicle, such a situation is unlikely to occur that, by light to almost the entire area of all the band-shaped patterns being blocked by the blocking object, the band-shaped patterns are not drawn on a road surface almost at all. Especially, since the further on the vehicle-width-direction outer side a band-shaped pattern is, the further in the front side the front end thereof is located, light to the front end is not easily blocked by the blocking object even for a band-shaped pattern on the vehicle-width-direction outer side, and the front end is easily drawn on the road surface.

As described above, according to the present configuration, it is possible to improve the visibility of the pattern drawn on a road surface from the surroundings.

(2) The road surface drawing apparatus according to (1) above, wherein an extension direction of inner-side band-shaped patterns including at least a band-shaped pattern located innermost on an inner side in a vehicle width direction is inclined relative to the vehicle length direction, and front ends of the inner-side band-shaped patterns are located further on the inner side in the vehicle width direction than rear ends.

According to the present configuration, at the root part of the row of the plurality of the band-shaped patterns, a direction in which band-shaped patterns are spaced is inclined to the vehicle side. Therefore, it is easy to recognize that the band-shaped pattern is emitted from the vehicle when the band-shaped pattern is seen from the surroundings.

(3) The road surface drawing apparatus according to (2) above, wherein widths of the rear ends of the inner-side band-shaped patterns are smaller than widths of the front ends, respectively.

When the extension direction of the inner-side band-shaped patterns is inclined relative to the vehicle length direction as described in (2), the further to the rear side, the shorter the intervals among the band-shaped patterns. From this, there is a possibility that it becomes difficult to separately recognize the band-shaped patterns when they are seen from the surroundings. In that respect, according to the present configuration, the widths of the rear ends of the inner-side band-shaped patterns are smaller than the widths of the front ends, respectively. Therefore, it is possible to secure, at the root part of the row of the plurality of the band-shaped patterns, sufficient spaces among the rear ends of the band-shaped patterns. Therefore, it is easy to clearly separately recognize the band-shaped patterns when they are seen from the surroundings.

(4) The road surface drawing apparatus according to (1) or (2) above, including a drawing control unit drawing the plurality of band-shaped patterns in order starting from a band-shaped pattern on the inner side in the vehicle width direction.

According to the present configuration, since the band-shaped patterns are drawn in order starting from the band-shaped pattern on the inner side in the vehicle width direction, it is easier to recognize in which direction the vehicle is going to turn when the band-shaped patterns are seen from the surroundings.

Effects of the Invention

As described above, according to the configuration of (1) above, it is possible to improve the visibility of a pattern drawn on a road surface. Furthermore, according to the configurations of (2) to (4) above referring to (1) above, their respective additional advantages are obtained.

PREFERRED MODE FOR CARRYING OUT THE INVENTION

Embodiments of the present invention will be described below with reference to drawings. The present invention, however, is not limited to the embodiments below at all and can be appropriately changed and practiced within a range not departing from the spirit of the present invention.

First Embodiment

Figure 1:
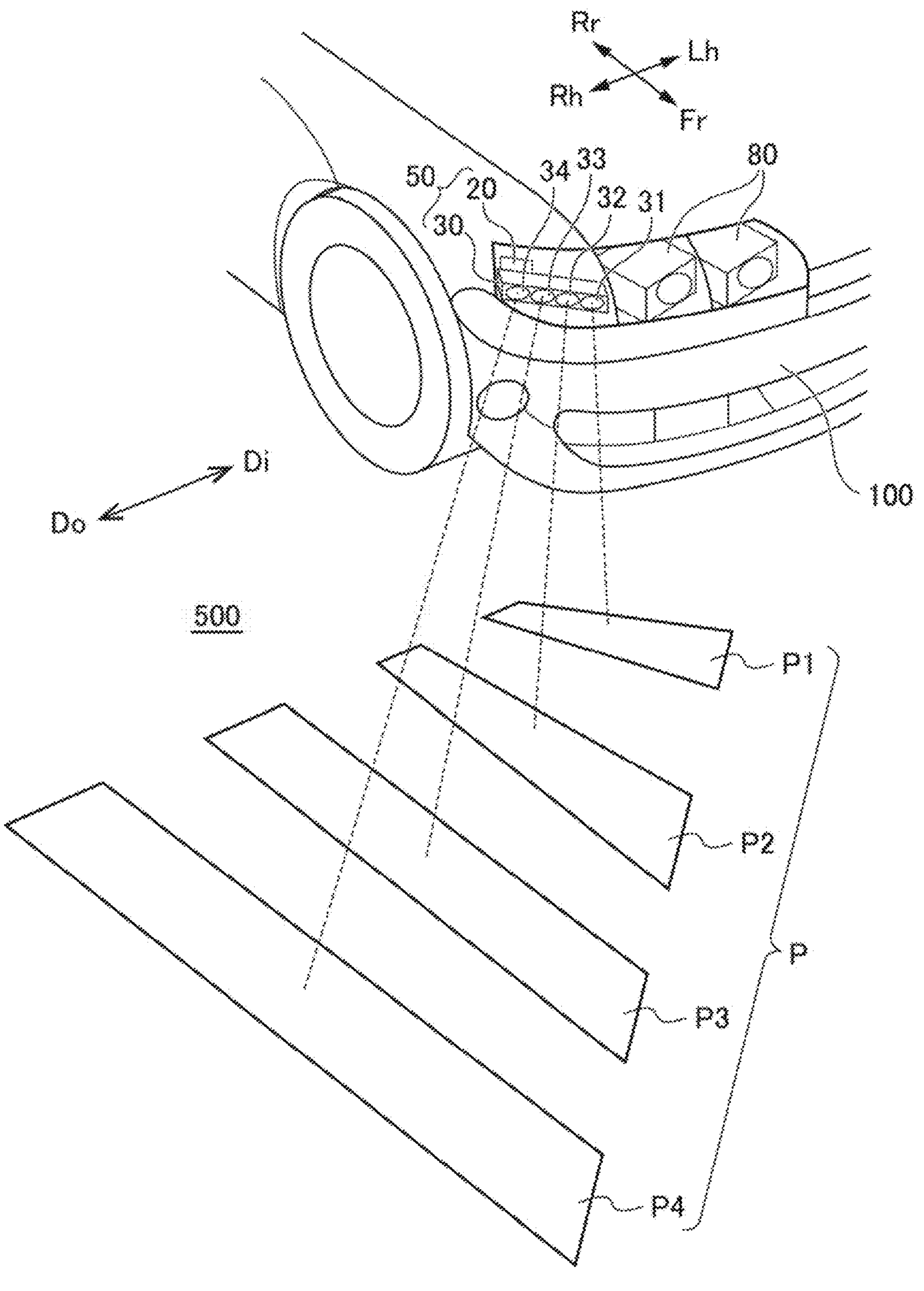
FIG. 1 is a perspective view showing a road surface drawing apparatus of a first embodiment and an area therearound.

FIG. 1 is a perspective view showing a road surface drawing apparatus 50 of a first embodiment and an area therearound. Hereinafter, a vehicle mounted with the road surface drawing apparatus 50 will be referred to as "a vehicle 100". Furthermore, the front side of the vehicle 100 in the vehicle length direction will be referred to as "a front Fr"; the opposite side thereof will be referred to as "a rear Rr"; the left side in the state of facing the front Fr will be referred to as "a left Lh"; and the opposite side thereof will be referred to as "a right Rh".

The road surface drawing apparatus 50 is mounted on each of both the left and right ends of the front end of the vehicle 100. Specifically, in FIG. 1, the road surface drawing apparatus 50 on the left Lh side, which is not shown in FIG. 1, is provided on the left Lh of a headlight 80 on the left Lh side, and the road surface drawing apparatus 50 on the right Rh side, which is shown in FIG. 1, is provided on the right Rh of a headlight 80 on the right Rh side.

When the vehicle 100 turns left based on an operation by the driver of the vehicle 100, the road surface drawing apparatus 50 on the left side draws a pattern P for notifying the left turn of the vehicle 100 by means of light in an area including the left Lh side of the vehicle 100 on a road surface 500. When the vehicle 100 turns right based on an operation by the driver of the vehicle 100, the road surface drawing apparatus 50 on the right side draws a pattern P for notifying the right turn of the vehicle 100 by means of light in an area including the right Rh side of the vehicle 100 on the road surface 500.

Hereinafter, the left Lh for the road surface drawing apparatus 50 on the left side and the right Rh for the road surface drawing apparatus 50 on the right side will be referred to as "an outer side in the vehicle width direction Do", and the right for the road surface drawing apparatus 50 on the left side and the left for the road surface drawing apparatus 50 on the right side will be referred to as "a vehicle-width-direction inner side Di".

Each of the left and right road surface drawing apparatuses 50 draws a predetermined pattern P on the road surface 500. The pattern P has a plurality of band-shaped patterns P1 to P4 extending in a vehicle length direction Fr, Rr, at intervals in the vehicle width direction Di, Do. Specifically, there are four band-shaped patterns P1 to P4 in the present embodiment. Hereinafter, these four band-shaped patterns P1 to P4 will be referred to as "a first band-shaped pattern P1", "a second band-shaped pattern P2", "a third band-shaped pattern P3", and "a fourth band-shaped pattern P4" in that order, starting from the band-shaped pattern P1 on the inner side in the vehicle width direction Di. Though the pattern P consists of only the four band-shaped patterns P1 to P4 in FIG. 1, it may include other patterns. Further, the number of band-shaped patterns may be equal to or smaller than three or equal to or larger than five.

Each of the left and right road surface drawing apparatuses 50 includes a drawing machine 30 that draws the pattern P and a drawing control unit 20 that controls the drawing machine 30.

For example, as shown in FIG. 1, the drawing machine 30 includes a first drawing unit 31 that draws the first band-shaped pattern P1, a second drawing unit 32 that draws the second band-shaped pattern P2, a third drawing unit 33 that draws the third band-shaped pattern P3, and a fourth drawing unit 34 that draws the fourth band-shaped pattern P4. The four drawing units 31 to 34 include light sources, shades, and lenses, respectively. The shades include translucent parts in the forms of the band-shaped patterns P1 to P4 drawn by the drawing units 31 to 34 to which the shades belong, respectively. In the drawing units 31 to 34, light emitted from the light sources passes through the translucent parts of the shades and is transmitted through the lenses. Then, the light reaches the road surface 500. Thereby, the band-shaped patterns P1 to P4 based on the drawing units 31 to 34 are drawn on the road surface 500.

Instead of the above, however, the drawing machine 30 may be, for example, such that includes one light source and a film and appropriately draws a part or all of the four band-shaped patterns P1 to P4 described before on the road surface 500 by transmitting light from the one light source through the film.

Figure 2:
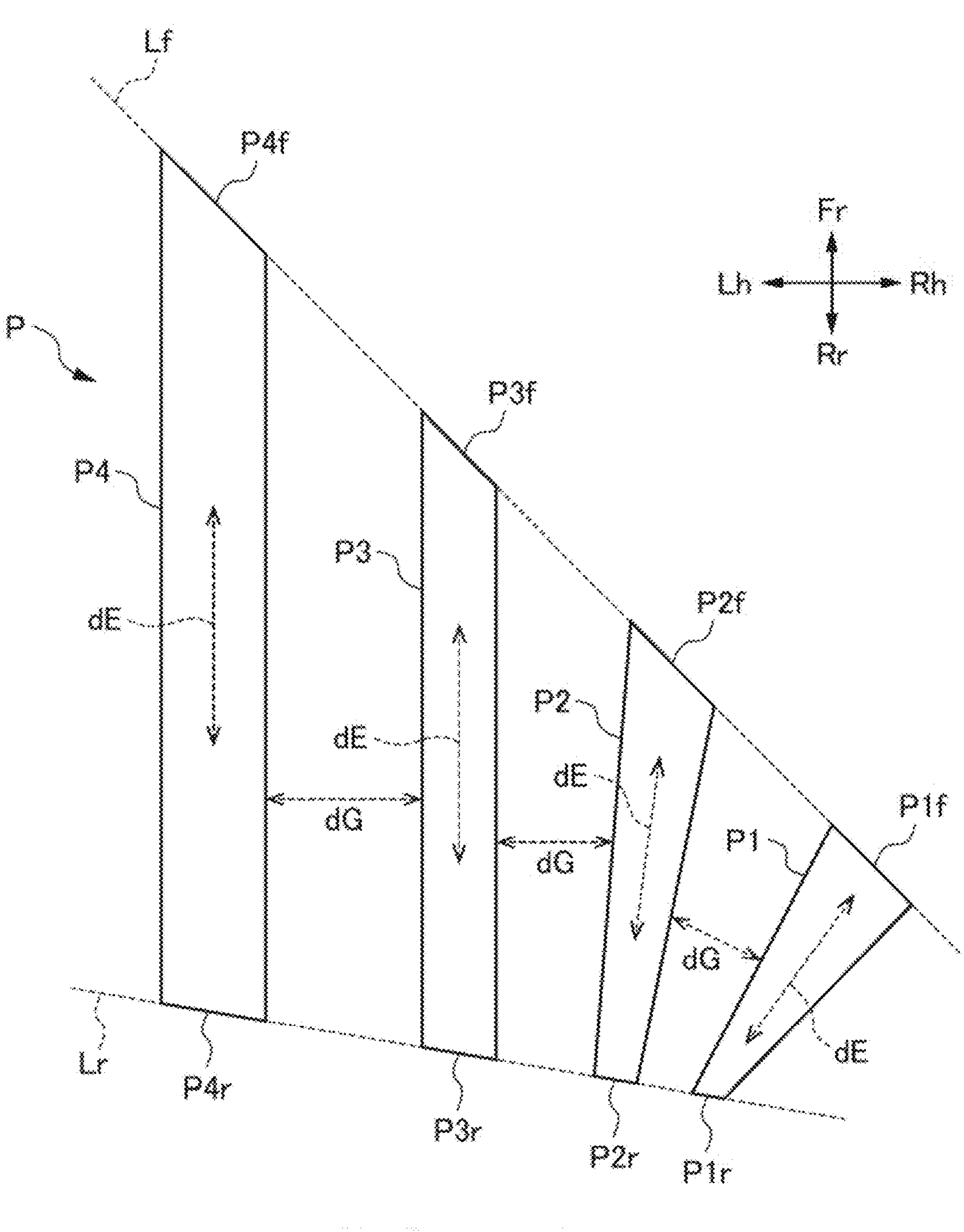
FIG. 2 is a plan view showing band-shaped patterns drawn on a road surface.

FIG. 2 is a plan view of the pattern P seen from above, the pattern P being drawn on the road surface 500 by the road surface drawing apparatus 50 on the left side, which is not shown in FIG. 1, at the time of turning left. Hereinafter, the length direction of the center line of each of the band-shaped patterns P1 to P4 in the plan view will be referred to as "an extension direction dE". The first band-shaped pattern P1 extends obliquely relative to the vehicle length direction Fr, Rr. That is, the extension direction dE of the first band-shaped pattern P1 is inclined relative to the vehicle length direction Fr, Rr. A front end P1*f* of the first band-shaped pattern P1 is located further on the vehicle-width-direction inner side Di than a rear end P1*r*.

The second band-shaped pattern P2 also extends slightly obliquely relative to the vehicle length direction Fr, Rr, and a front end P2*f* of the second band-shaped pattern P2 is located slightly further on the vehicle-width-direction inner side Di than a rear end P2*r*. The second band-shaped pattern P2 is longer than the first band-shaped pattern P1 in the vehicle length direction Fr, Rr, and the front end P2*f* is located further in the front Fr than the front end P1*f* of the first band-shaped pattern P1.

Hereinafter, a band-shaped pattern that extends obliquely relative to the vehicle length direction Fr, Rr, like the first band-shaped pattern P1 and the second band-shaped pattern P2 will be referred to as "an inner-side band-shaped pattern". Though there are two inner-side band-shaped patterns, the first band-shaped pattern P1 and the second band-shaped pattern P2, in the present embodiment, there may be only one inner-side band-shaped pattern or three or more inner-side band-shaped patterns. According to the inner-side band-shaped patterns P1 and P2, directions dG in which the band-shaped patterns P1 to P4 are spaced are inclined to the vehicle 100 side at the root part of the row of the plurality of the band-shaped patterns P1 to P4.

The width of the rear end Pir of the first band-shaped pattern P1 is smaller than the width of the front end P1*f* of the first band-shaped pattern P1, and the width of the rear end P2*r* of the second band-shaped pattern P2 is smaller than the width of the front end P2*f* of the second band-shaped pattern P2. That is, the widths of the rear ends P1*r* and P2*r* of the inner-side band-shaped patterns P1 and P2 are smaller than the widths of the front ends P1*f* and P2*f*. The width stated here is a length in a direction orthogonal to the extension direction dE in the plan view seen from above.

Each of the third band-shaped pattern P3 and the fourth band-shaped pattern P4 extends almost straight in the vehicle length direction Fr, Rr. The third band-shaped pattern P3 is longer than the second band-shaped pattern P2 in the vehicle length direction Fr, Rr, and a front end P3*f* is located further in the front Fr than the front end P2*f* of the second band-shaped pattern P2. The fourth band-shaped pattern P4 is longer than the third band-shaped pattern P3 in the vehicle length direction Fr, Rr, and a front end P4*f* is further located in the front Fr than the front end P3*f* of the third-shaped pattern P3. That is, these four band-shaped patterns P1 to P4 are arranged such that the further on the vehicle-width-direction outer side Do a band-shaped pattern is, the longer in the vehicle length direction Fr, Rr the band-shaped pattern is, and the further in the front Fr the front end thereof is located.

More specifically, in the present embodiment, the front ends P1*f* to P4*f* of the band-shaped patterns P1 are located on a front-side virtual straight line Lf that extends in an oblique direction between the front Fr and the vehicle-width-direction outer side Do, and the rear ends P1*r* to P4*r* of the band-shaped patterns P1 are located on a rear-side virtual straight line Lr that extends in the vehicle-width-direction outer side Do. In the present embodiment, the rear-side virtual straight line Lr is slightly inclined relative to the vehicle width direction Di, Do; and the band-shaped patterns P4 to P1 are arranged such that the further on the width-direction outer side Do a band-shaped pattern is, the further in the front Fr the rear end thereof is located. Instead thereof, however, the rear-side virtual straight line Lr may extend right to the side, and the rear ends P4*r* to P1*r* of the band-shaped pattern P4 to P1 may be lined up side by side. Further, contrary to the case of FIG. 2, the rear-side virtual straight line Lr may be inclined to a side where the band-shaped patterns P4 to P1 are arranged such that the further on the vehicle-width-direction outer side Do a band-shaped pattern is, the further in the rear Rr the rear end thereof is located.

The description has been made above on the pattern P on the left side which is drawn when the vehicle 100 turns left. Description on the pattern P on the right side which is drawn when the vehicle 100 turns right can be similarly made, in which left and right in the above description are exchanged.

Figure 3:
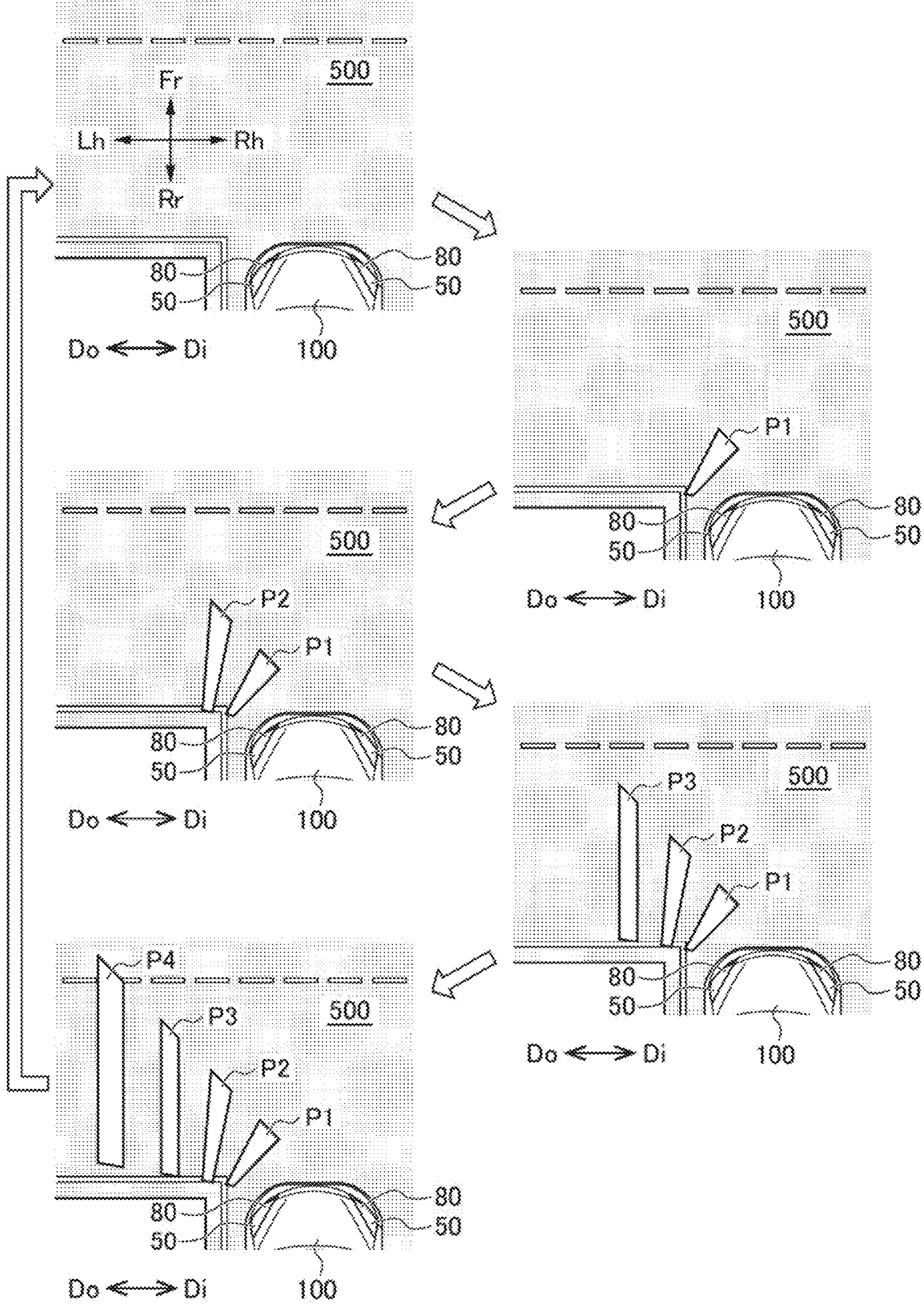
FIG. 3 shows plan views showing control by a drawing control unit.

FIG. 3 shows plan views showing control of the drawing machine 30 by the drawing control unit 20. For example, at the time of turning left, the drawing control unit 20 turns on the light source of the first drawing unit 31 first in a state in which all the light sources of the drawing units 31 to 34 are off, that is, in a state in which none of the band-shaped patterns P1 to P4 is drawn on the road surface 500 as shown on the upper left of FIG. 3. Thereby, the first band-shaped pattern P1 is drawn on the road surface 500 as shown on the upper right of FIG. 3.

Next, while the light source of the first drawing unit 31 is kept being on, the light source of the second drawing unit 32 is also turned on. Thereby, the second band-shaped pattern P2 is also drawn on the road surface 500 as shown on the middle left of FIG. 3.

Next, while the light sources of the first drawing unit 31 and the second drawing unit 32 are kept being on, the light source of the third drawing unit 33 is also turned on. Thereby, the third band-shaped pattern P3 is also drawn on the road surface 500 as shown on the lower right of FIG. 3.

Next, while the light sources of the first drawing unit 31, the second drawing unit 32, and the third drawing unit 33 are kept being on, the light source of the fourth drawing unit 34 is also turned on. Thereby, the fourth band-shaped pattern P4 is also drawn on the road surface 500 as shown on the lower left of FIG. 3.

After that, the light sources of the four drawing units 31 to 34 are turned off. Thereby, the four band-shaped patterns P1 to P4 disappear from the road surface 500 as shown on the upper left of FIG. 3. The above operation is repeated. Thereby, the operation of the four band-shaped patterns P1 to P4 being drawn in order starting from a band-shaped pattern on the inner side in the vehicle width direction Di is repeatedly performed.

In the case where the drawing machine 30 includes one light source and a film instead of the four drawing units 31 to 34 as described before, however, dynamic drawing similar to the above may be repeatedly performed by performing control of the film and the like instead of the above control.

Furthermore, the method for turning on the four band-shaped patterns P1 to P4 is not limited to the above. For example, after turning on the first band-shaped pattern P1 and the second band-shaped pattern P2 at the same time, the third band-shaped pattern P3 and the fourth band-shaped pattern P4 may be turned on at the same time. Furthermore, after turning on the four band-shaped patterns P1 to P4 with the light reduced, the light may be increased in the order of the first band-shaped pattern P1, the second band-shaped pattern P2, the third band-shaped pattern P3, and the fourth band-shaped pattern P4.

The above description has been made on the time when the vehicle 100 turns left. Similar control is also performed when the vehicle 100 turns right, in which left and right in the above description are exchanged.

Functions of the present embodiment will be described below with reference to FIGS. 4 to 11. Hereinafter, an aspect of drawing only one band-shaped pattern Px that extends in an oblique direction between the front Fr and the vehicle-width-direction outer side Do as the pattern P will be referred to as a comparative example. Furthermore, hereinafter, another vehicle near the vehicle 100 will be referred to as "the other vehicle 200".

Figure 4:
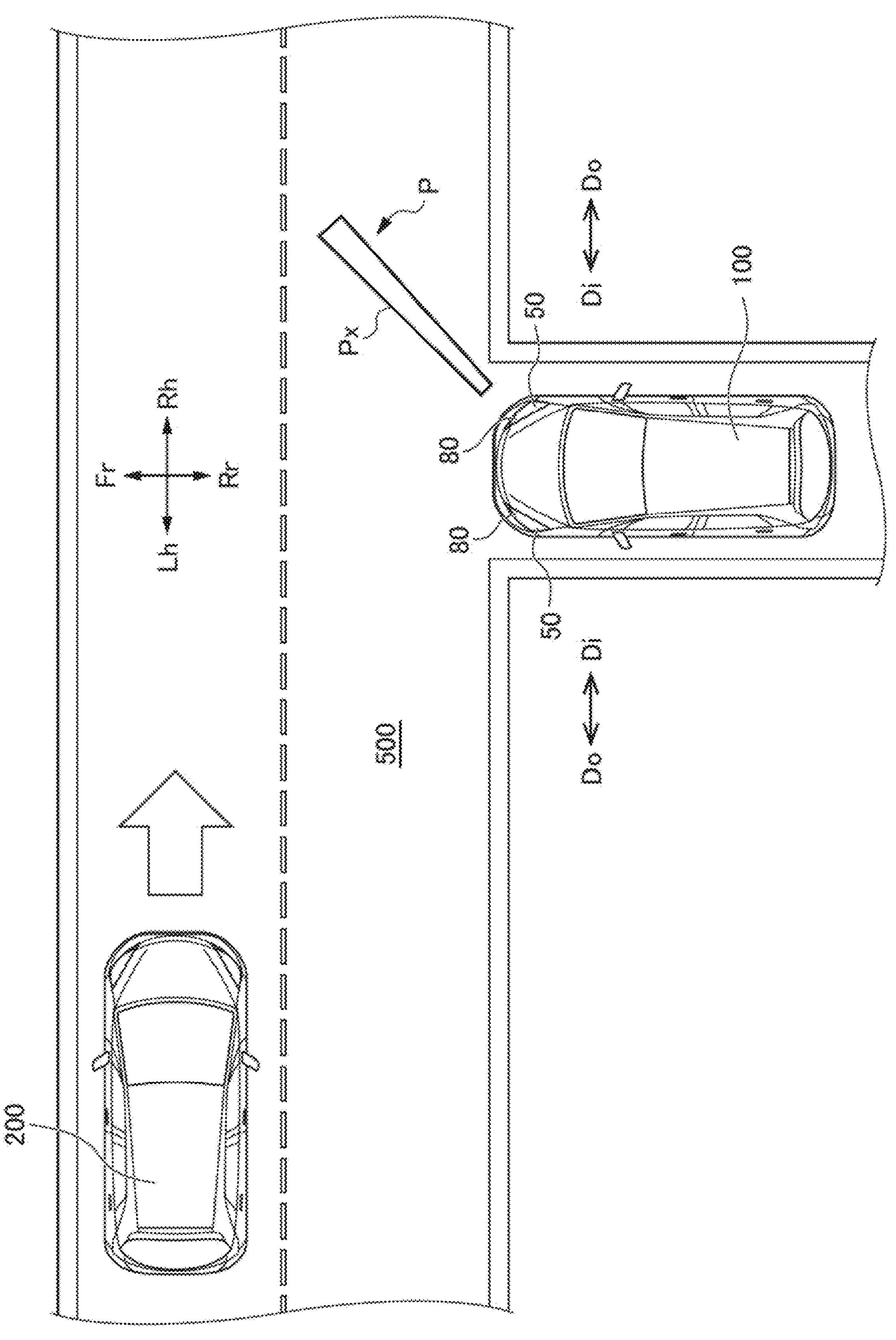
FIG. 4 is a plan view showing the time of turning right in a comparative example.

FIG. 4 is a plan view showing the time when the vehicle 100 turns right in the comparative example. In the case of this comparative example, since the pattern P consists of only the one band-shaped pattern Px, the total area of the pattern P drawn on the road surface 500 is small.

Figure 5:
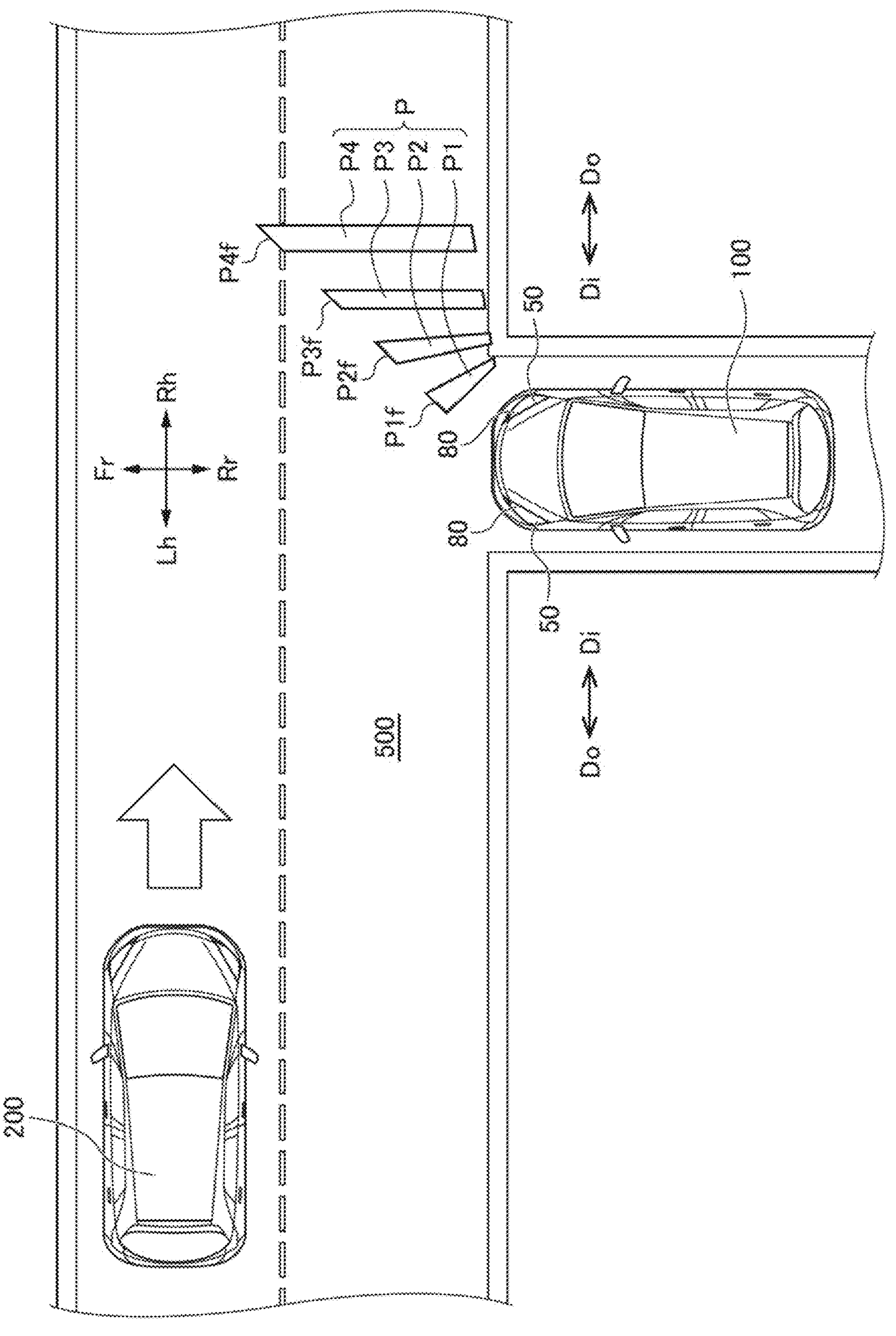
FIG. 5 is a plan view showing the time of turning right in the present embodiment.

In comparison, FIG. 5 is a plan view showing the time when the vehicle 100 turns right in the present embodiment. In the case of the present embodiment, in addition to the pattern P including the plurality of band-shaped patterns P1 to P4 in the vehicle width direction Di, Do, the band-shaped patterns P1 to P4 extend in the vehicle length direction Fr, Rr, and, therefore, the total area of the pattern P drawn on the road surface 500 is large. Therefore, it is easy for the driver of the other vehicle 200 to visually confirm the pattern P. Moreover, the plurality of band-shaped patterns P1 to P4 are arranged such that the further on the vehicle-width-direction outer side Do a band-shaped pattern is, the longer in the vehicle length direction Fr, Rr the band-shaped pattern is, and the further in the front Fr the front end thereof is located. Therefore, it is easy for the driver of the other vehicle 200 to intuitively recognize the side to which the vehicle 100 is going to change the travel direction, that is, that the vehicle 100 is going to turn right. The above description has been made on the time when the vehicle 100 turns right. A similar function is obtained for the case of the vehicle 100 turning left, in which left and right in the above description are exchanged.

Figure 6:
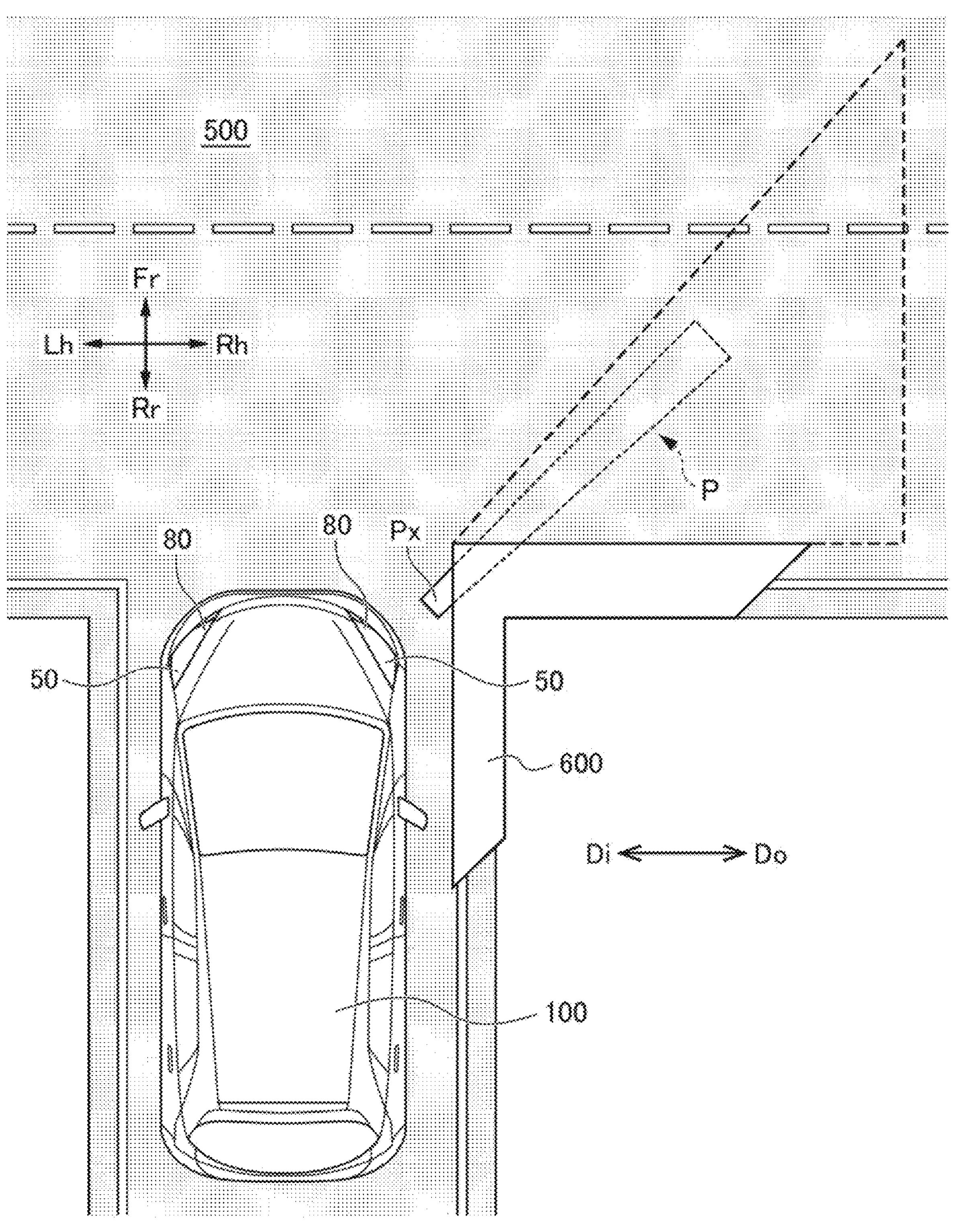
FIG. 6 is a plan view showing a case where there is a blocking object on the right at the time of turning right in the comparative example.

FIG. 6 is a plan view showing a case where, when the vehicle 100 turns right in the comparative example, there is a blocking object 600, for example, a wall, a signboard, or a utility pole on the right Rh of the front end of the vehicle 100. In the case of this comparative example, since the pattern P consists of only one band-shaped pattern Px, light to almost the entire area of the pattern P is easily blocked by the blocking object 600.

Figure 7:
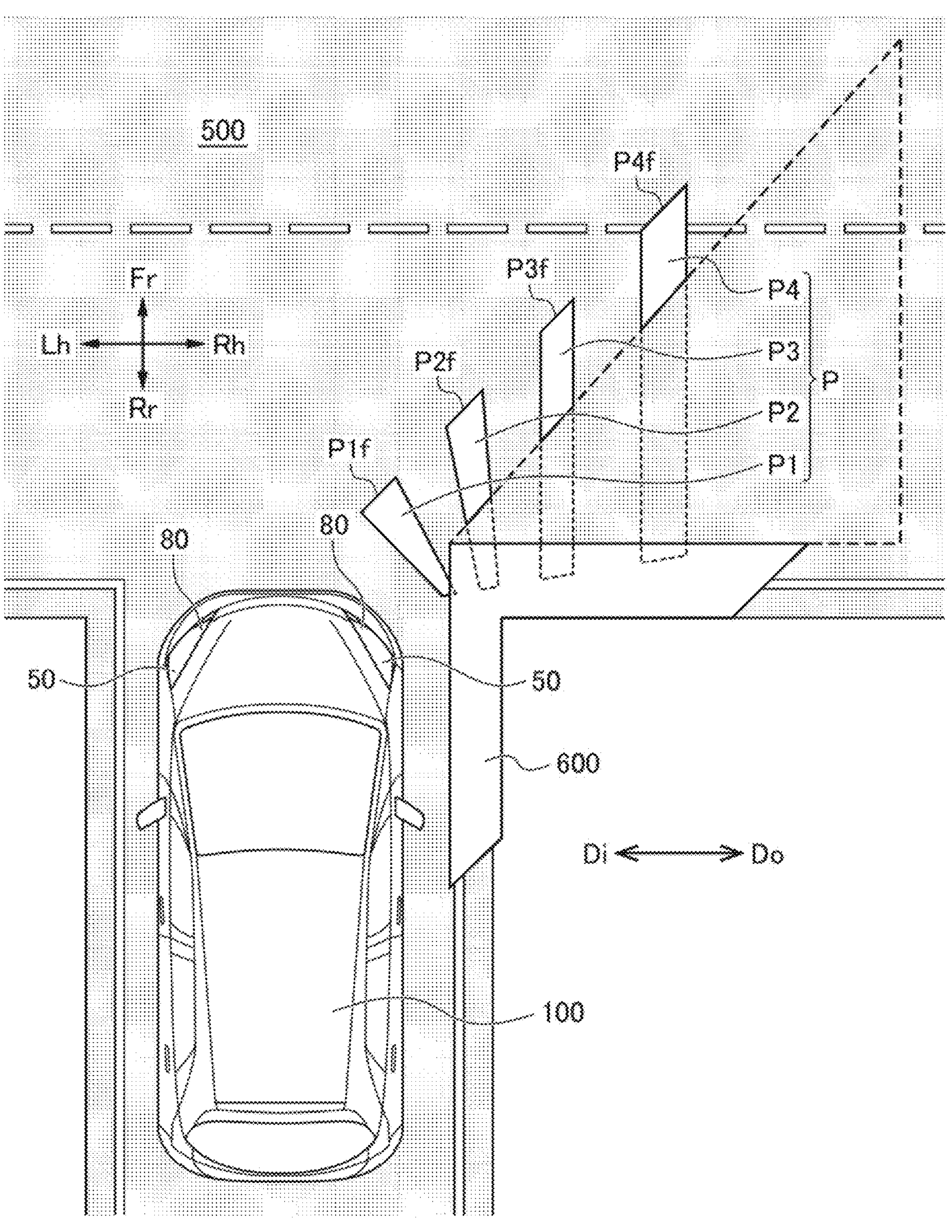
FIG. 7 is a plan view showing a case where there is a blocking object on the right at the time of turning right in the present embodiment.

In comparison, FIG. 7 is a plan view showing a case where, when the vehicle 100 turns right in the present embodiment, the blocking object 600 exists on the right Rh of the front end of the vehicle 100. In the case of the present embodiment, in addition to that the plurality of band-shaped patterns P1 to P4 exist in the vehicle width direction Di, Do, the band-shaped patterns P1 to P4 extend in the vehicle length direction Fr, Rr, as described before. Therefore, even if the blocking object 600 exists as described above, such a situation is unlikely to occur that light to almost the entire area of all the band-shaped patterns P1 to P4 is blocked by the blocking object 600, and the band-shaped patterns P1 to P4 are not drawn on the road surface 500 almost at all. Especially, the band-shaped patterns P4 to P1 are arranged such that the further on the vehicle-width-direction outer side Do a band-shaped pattern is, the further in the front Fr the front end thereof is located, and, therefore, even for the fourth band-shaped pattern P4 at the outermost on the vehicle-width-direction outer side Do, light to the front end is not easily blocked by the blocking object 600, and the front end is easily drawn on the road surface 500. The above description has been made on the time when the vehicle 100 turns right, as an example. A similar function is obtained for the case of the vehicle 100 turning left, in which left and right in the above description are exchanged.

Figure 8:
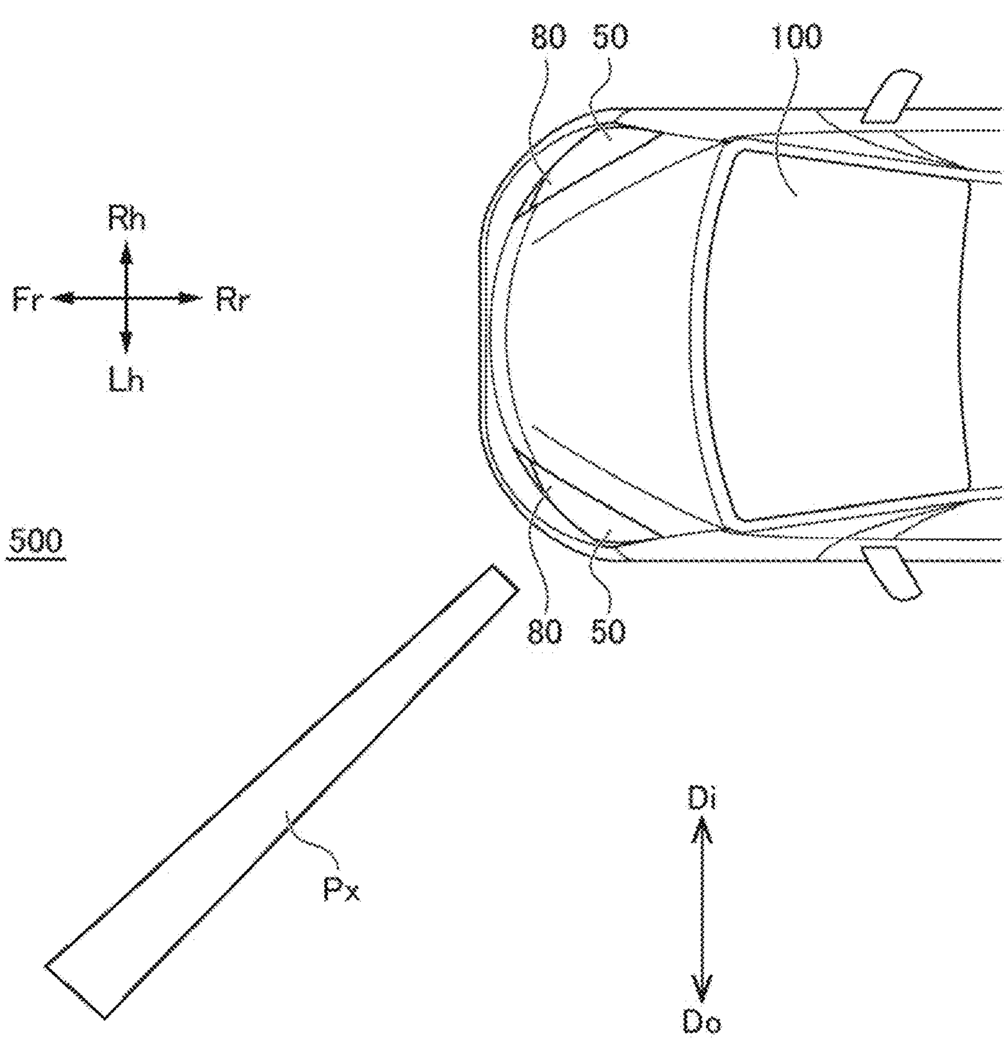
FIG. 8 is a plan view showing a pattern at the time of turning left in the comparative example.
Figure 9:
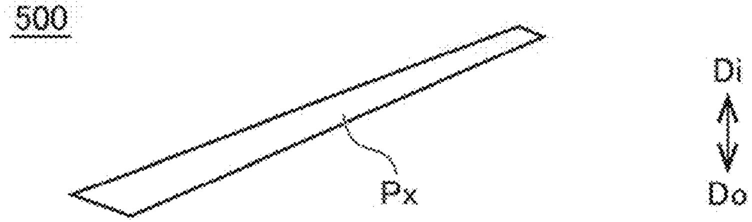
FIG. 9 is a diagram of the same pattern seen from the far left.

FIG. 8 is a plan view of the band-shaped pattern Px at the time of turning left in the comparative example, which is seen from above. FIG. 9 is a diagram of the band-shaped pattern Px seen from afar in the vehicle-width-direction outer side Do, that is, from afar on the left Lh side. When the band-shaped pattern Px is seen from afar as in FIG. 9, the shape of the band-shaped pattern Px is compressed in the vehicle width direction Di, Do, and the angle in the extension direction of the band-shaped pattern Px relative to the vehicle length direction Fr, Rr becomes small. Therefore, there is a possibility that it becomes difficult to visually confirm in which direction the vehicle 100 is going to turn.

Figure 10:
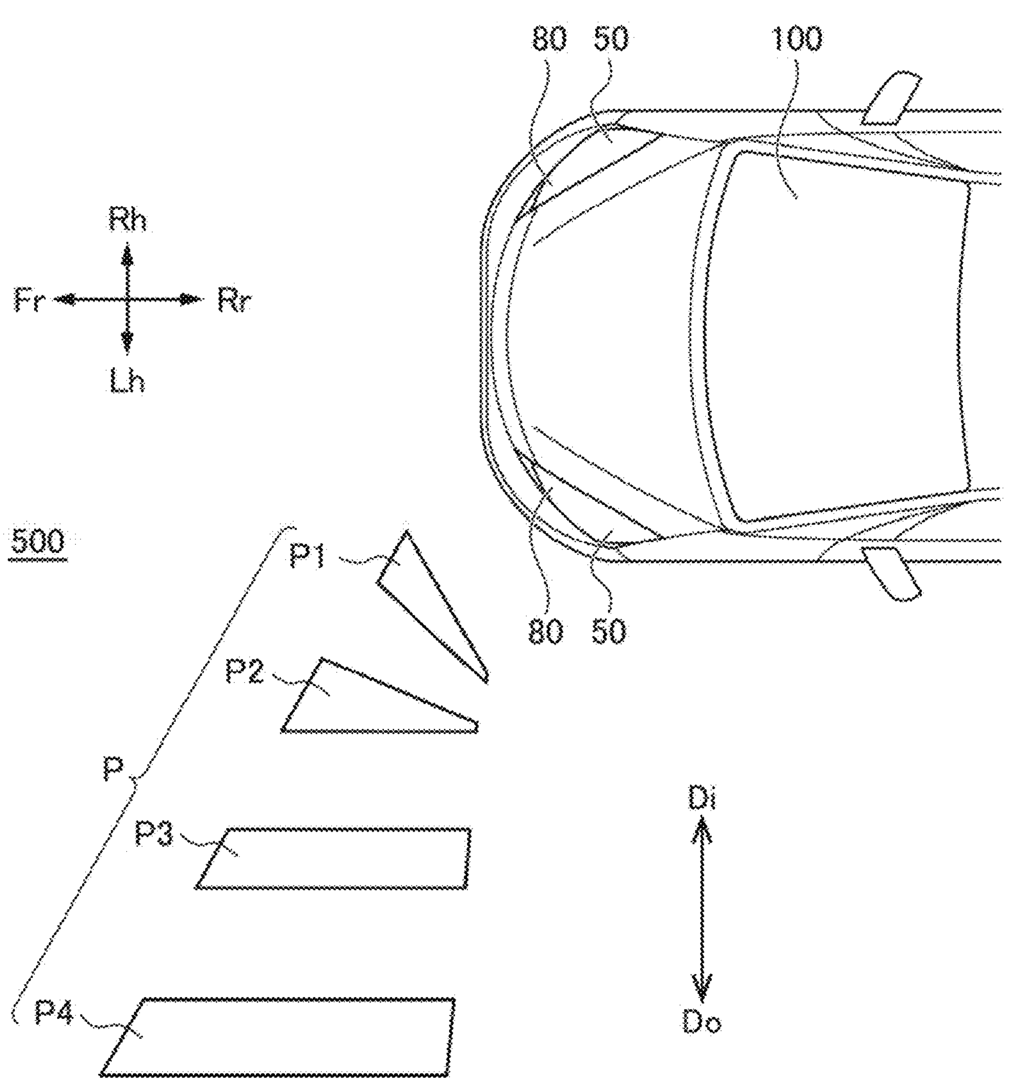
FIG. 10 is a plan view showing the band-shaped patterns at the time of turning left in the present embodiment.
Figure 11:
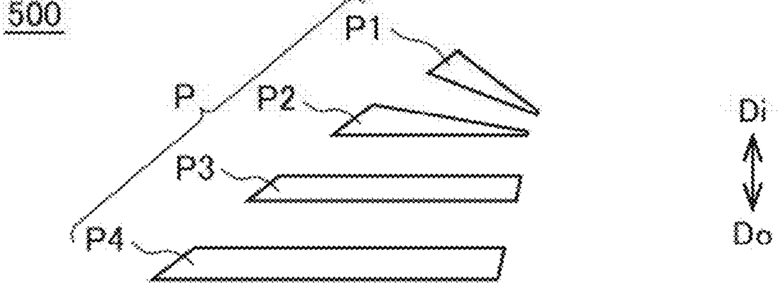
FIG. 11 is a diagram of the same band-shaped patterns seen from the far left.

In comparison, FIG. 10 is a plan view of the band-shaped patterns P1 to P4 at the time of turning left in the present embodiment, which are seen from above. FIG. 11 is a diagram of the band-shaped patterns P1 to P4 seen from afar on the left Lh side. The shapes of the band-shaped patterns P1 to P4 of the present embodiment are also compressed in the vehicle width direction Di, Do when they are seen from afar. However, these plurality of band-shaped patterns P1 to P4 are lined up in the vehicle width direction Di, Do at intervals, and the band-shaped patterns P4 to P1 are arranged such that the further on the vehicle-width-direction outer side Do a band-shaped pattern is, the longer in the vehicle length direction Fr, Rr the band-shaped pattern is, and the further in the front Fr the front end thereof is located. Therefore, it is easy to visually confirm in which direction the vehicle 100 is going to turn even when the band-shaped patterns P1 to P4 are seen from afar as in FIG. 11. The above description has been made on the time when the vehicle 100 turns left, as an example. A similar function is obtained for the case of the vehicle 100 turning right, in which left and right in the above description are exchanged.

The configuration and advantages of the present embodiment will be summarized below.

The band-shaped patterns P4 to P1 are arranged such that the further on the vehicle-width-direction outer side Do a band-shaped pattern is, the longer in the vehicle length direction Fr, Rr the band-shaped pattern is, and the further in the front Fr the front end thereof is located. Therefore, it is easy to intuitively recognize in which direction the vehicle 100 is going to turn when the band-shaped patterns P4 to P1 are seen from the surroundings. Furthermore, since the band-shaped patterns P1 to P4 have such shapes, it is easy to visually confirm in which direction the vehicle 100 is going to turn even when the band-shaped patterns P1 to P4 are seen from afar, that is, when the band-shaped patterns P1 to P4 are compressed in the vehicle width direction Di, Do.

Moreover, in addition to that the plurality of band-shaped patterns P1 to P4 exist in the vehicle width direction Di, Do, the band-shaped patterns P4 to P1 are arranged such that the further on the vehicle-width-direction outer side Do a band-shaped pattern is, the further in the front Fr side the front end thereof is located. Therefore, even if the blocking object 600 exists right next to the front end of the vehicle 100, such a situation is unlikely to occur that light to almost the entire area of all the band-shaped patterns P1 to P4 is blocked by the blocking object 600, and the band-shaped patterns P1 to P4 are not drawn on the road surface 500 almost at all. Especially, the band-shaped patterns P4 to P1 are arranged such that the further on the vehicle-width-direction outer side Do a band-shaped pattern is, the further in the front Fr the front end thereof is located, and, therefore, even for the fourth band-shaped pattern P4 at the outermost on the vehicle-width-direction outer side Do, light to the front end is not easily blocked by the blocking object 600, and the front end is easily drawn on the road surface 500.

As described above, according to the present configuration, it is possible to improve the visibility of the pattern P drawn on the road surface 500.

Moreover, the extension directions dE of the inner-side band-shaped patterns P1 and P2 are inclined relative to the vehicle length direction Fr, Rr, and the front ends P1*f* and P2*f* of the inner-side band-shaped patterns P1 and P2 are located further on the vehicle-width-direction inner side Di than the rear ends P1*r* and P2*r*. Therefore, at the root part of the row of the plurality of band-shaped patterns P1 to P4, a direction dG in which the band-shaped patterns P1 and P2 are spaced is inclined to the vehicle 100 side. Therefore, it is easy to confirm that the plurality of band-shaped patterns P1 to P4 are emitted from the vehicle 100 when they are seen from the surroundings.

Moreover, it is possible to avoid the adverse effect shown below. That is, when the extension directions dE of the inner-side band-shaped patterns P1 and P2 are inclined relative to the vehicle length direction Fr, Rr as described above, the further on the rear Rr side, the shorter becomes the interval between the band-shaped patterns P1 and P2. Therefore, there is a possibility that it becomes difficult to separately recognize the band-shaped patterns P1 and P2 when they are seen from the surroundings.

In that respect, as for the inner-side band-shaped patterns P1 and P2 of the present embodiment, the widths of the rear ends P1*r* and P2*r* are smaller than widths of the front ends P1*f* and P2*f*. Therefore, it is possible to secure a space between the rear ends P1*r* and P2*r* of the band-shaped patterns P1 and P2, at the root part of the row of the plurality of the band-shaped patterns P1 to P4. Therefore, it is easy to clearly separately recognize the band-shaped pattern P1 and P2 when they are seen from the surroundings.

The drawing control unit 20 draws the plurality of band-shaped patterns P1 to P4 in that order, starting from the band-shaped pattern on the inner side in the vehicle width direction Di. Therefore, it is easy to more clearly recognize in which direction the vehicle 100 is going to turn when the band-shaped patterns P1 to P4 are seen from the surroundings.

Second Embodiment

Next, a second embodiment will be described. As for the following embodiment, a description will be made mainly on points different from the first embodiment, based on the first embodiment, and a description of points that are the same as or similar to the first embodiments will be appropriately omitted.

Figure 12:
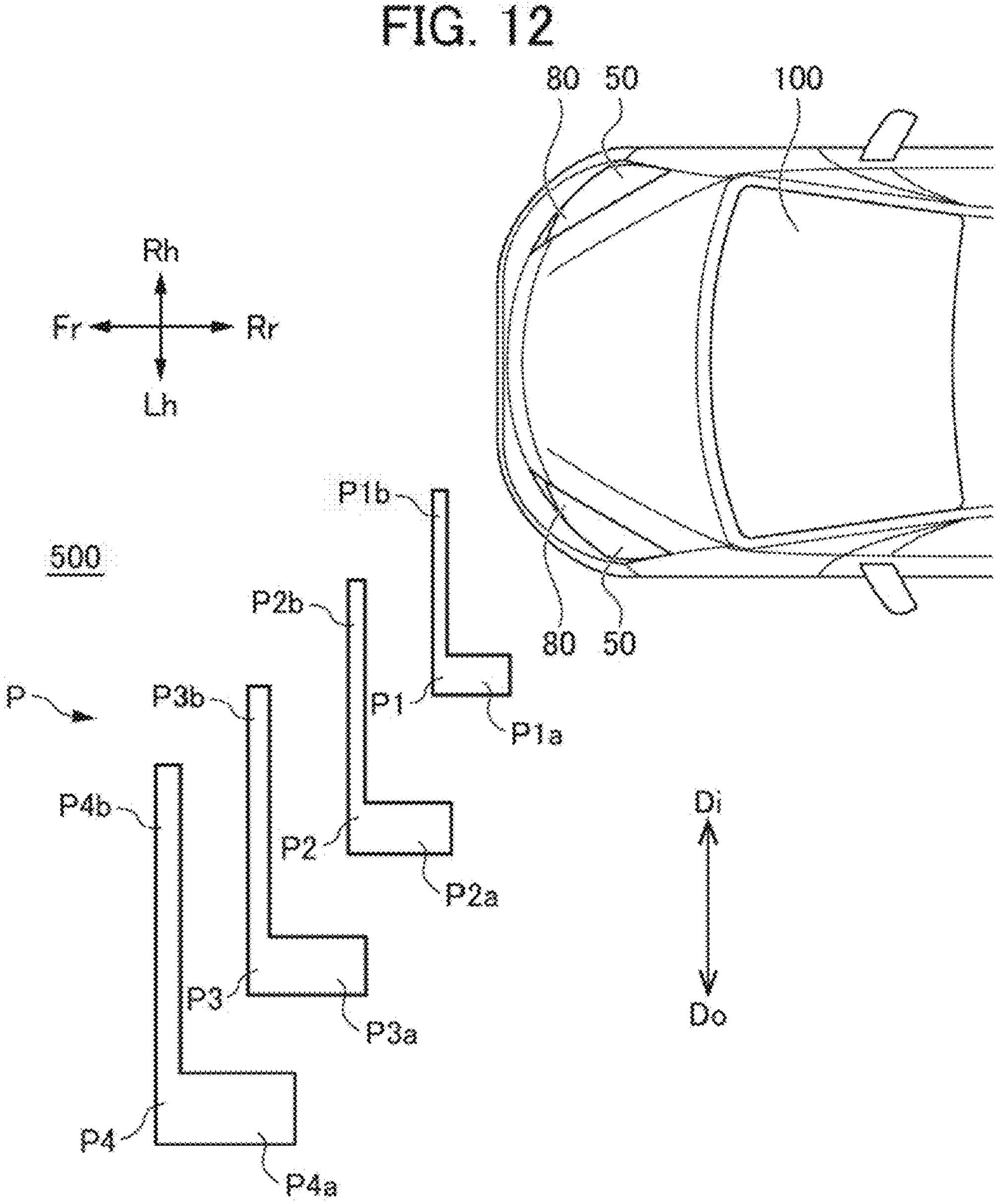
FIG. 12 is a plan view showing band-shaped patterns at the time of turning left in a second embodiment.
Figure 13:
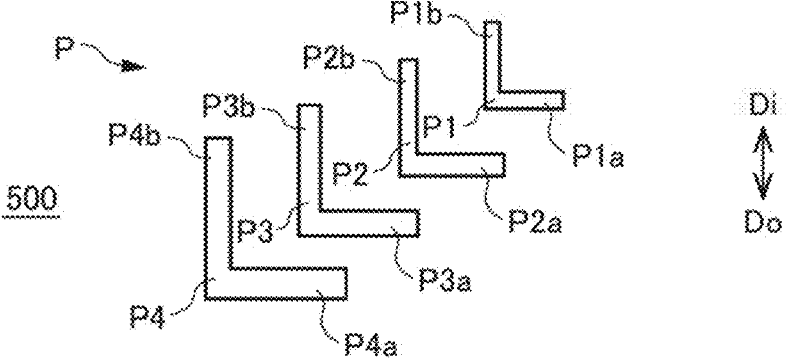
FIG. 13 is a diagram of the same band-shaped patterns seen from the far left.

FIG. 12 is a plan view of the band-shaped patterns P1 to P4 at the time of turning left in the present embodiment, which are seen from above. FIG. 13 is a diagram of the band-shaped patterns P1 to P4 seen from afar on the vehicle-width-direction outer side Do side. In the present embodiment, the band-shaped patterns P1 to P4 include front/rear extending portions p1*a* to p4*a* that extend in the vehicle length direction Fr, Rr, and inner-side extending portions p1*b* to p4*b* that extend from the front ends of the front/rear extending portions p1*a* to p4*a* to the vehicle-width-direction inner side Di, respectively.

According to the present embodiment, it is also possible to improve the visibility of the pattern P drawn on the road surface 500 in comparison with the comparable example shown in FIGS. 8 and 9, and the like.

Third Embodiment

Figure 14:
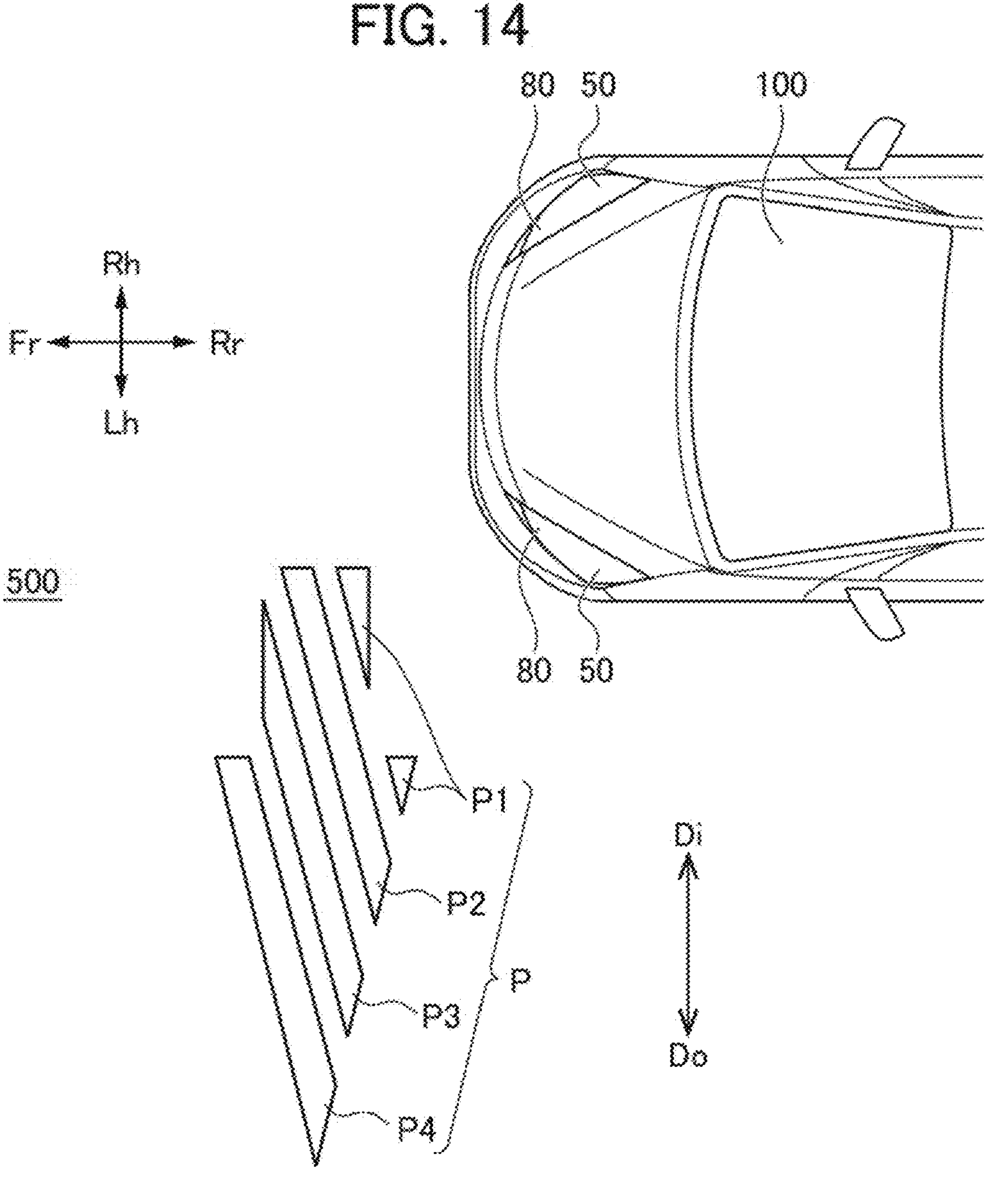
FIG. 14 is a plan view showing band-shaped patterns at the time of turning left in a third embodiment.
Figure 15:
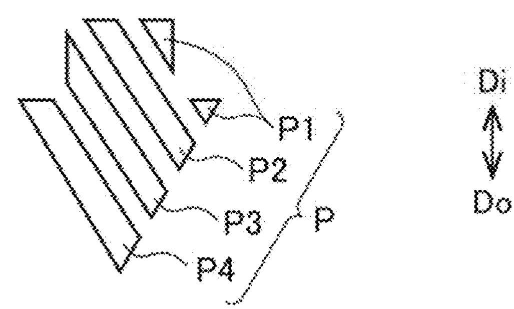
FIG. 15 is a diagram of the same band-shaped patterns seen from the far left.

FIG. 14 is a plan view of the band-shaped patterns P1 to P4 at the time of turning left in a third embodiment, which are seen from above. FIG. 15 is a diagram of the band-shaped patterns P1 to P4 seen from afar on the vehicle-width-direction outer side Do side. In the present embodiment, not only the first band-shaped pattern P1 and the second band-shaped pattern P2 but all the band-shaped patterns P1 to P4 extend obliquely relative to the vehicle length direction Fr, Rr. In this case also, the band-shaped patterns P1 to P4 can be said to be separated from one another in the vehicle width direction Di, Do because they are lined up in a vector direction that includes the vehicle width direction Di, Do as a component.

According to the present embodiment, it is also possible to improve the visibility of the pattern P drawn on the road surface 500 in comparison with the comparable example shown in FIGS. 8 and 9, and the like.

Fourth Embodiment

Figure 16:
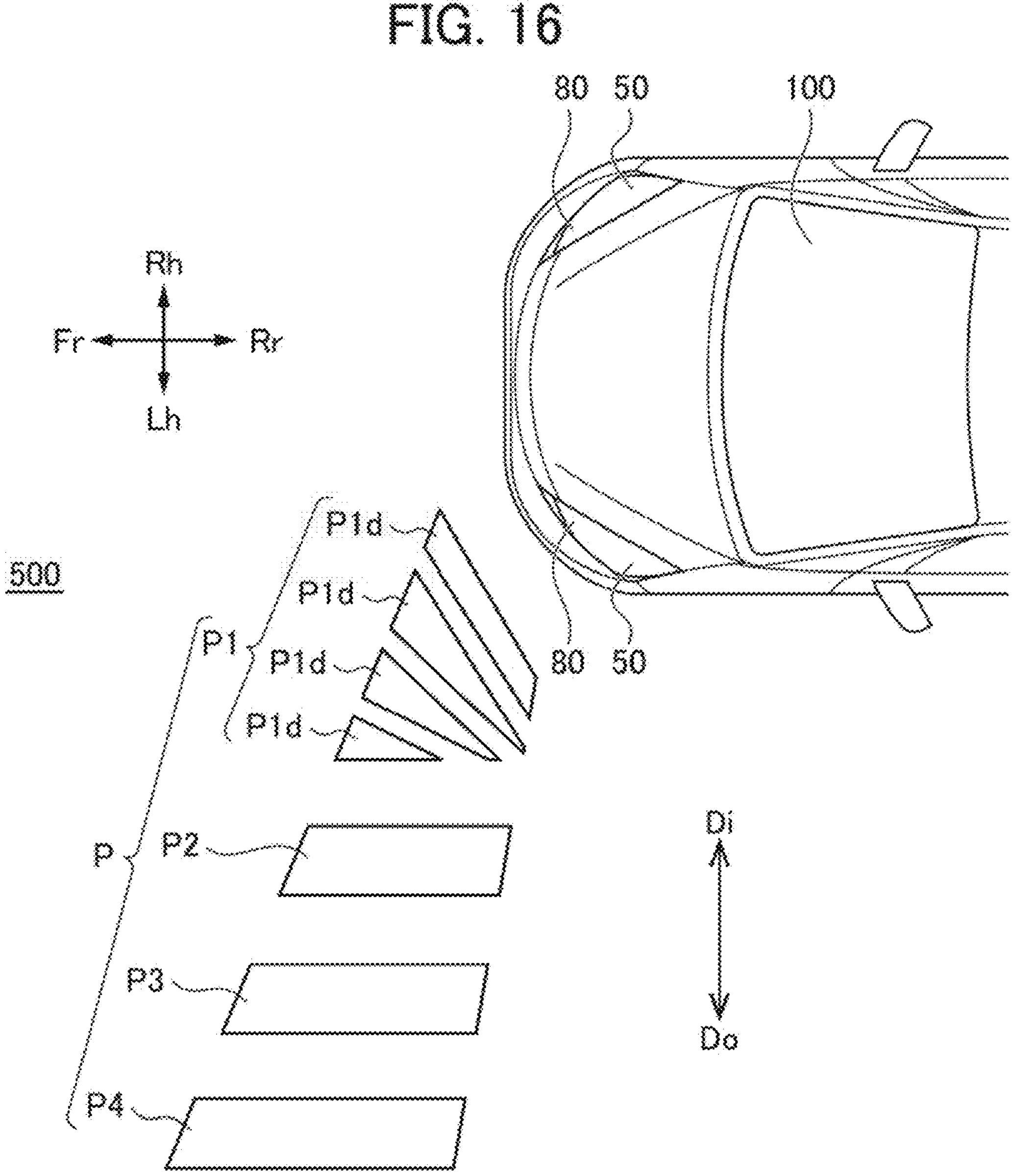
FIG. 16 is a plan view showing band-shaped patterns at the time of turning left in a fourth embodiment.
Figure 17:
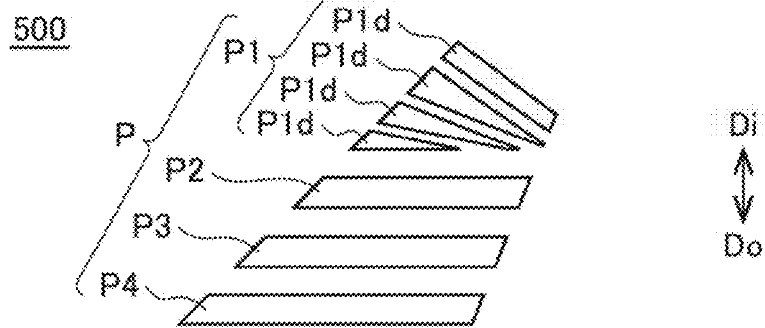
FIG. 17 is a diagram of the same band-shaped patterns seen from the far left.

FIG. 16 is a plan view of the band-shaped patterns P1 to P4 at the time of turning left in a fourth embodiment, which are seen from above. FIG. 17 is a diagram of the band-shaped patterns P1 to P4 seen from afar on the vehicle-width-direction outer side Do side.

In the present embodiment, the first band-shaped pattern P1 is divided in a plurality of divided patterns P1*d*, and each divided pattern P1*d* constitutes an inner-side band-shaped pattern that extends obliquely relative to the vehicle length direction Fr, Rr.

According to the present embodiment, it is also possible to improve the visibility of the pattern P drawn on the road surface 500 in comparison with the comparable example shown in FIGS. 8 and 9, and the like.

EXPLANATION OF REFERENCE NUMERALS

20 drawing control unit
30 drawing machine
50 road surface drawing apparatus
100 vehicle
500 road surface
P1 first band-shaped pattern (inner-side band-shaped pattern)
P1*f* front end of first band-shaped pattern P2 second band-shaped pattern (inner-side band-shaped pattern)

P2*f* front end of second band-shaped pattern

P3 third band-shaped pattern

P3*f* front end of third band-shaped pattern

P4 fourth band-shaped pattern

P4*f* front end of fourth band-shaped pattern

What is claimed is:

1. A road surface drawing apparatus mounted on a vehicle, the road surface drawing apparatus drawing by means of light, when a travel direction of the vehicle is changed based on an operation by a driver of the vehicle, a pattern for notifying a change in the travel direction, in an area on a road surface including a side to which the travel direction is to be changed, relative to the vehicle, the pattern including a plurality of band-shaped patterns separated from one another in a vehicle width direction of the vehicle, the plurality of band-shaped patterns being arranged such that the further on an outer side in the vehicle width direction, which is a side in a direction away from the vehicle in the vehicle width direction, a band-shaped pattern is, the longer in a vehicle length direction of the vehicle the band-shaped pattern is, and the further on a front side in the vehicle length direction a front end thereof is located.

2. The road surface drawing apparatus according to claim 1, wherein an extension direction of inner-side band-shaped patterns including at least a band-shaped pattern located innermost on an inner side in a vehicle width direction is inclined relative to the vehicle length direction, and front ends of the inner-side band-shaped patterns are located further on the inner side in the vehicle width direction than rear ends.

3. The road surface drawing apparatus according to claim 2, wherein widths of the rear ends of the inner-side band-shaped patterns are smaller than widths of the front ends, respectively.

4. The road surface drawing apparatus according to claim 1, comprising a drawing control unit drawing the plurality of band-shaped patterns in order starting from a band-shaped pattern on the inner side in the vehicle width direction.

* * * * *